UNITED STATES PATENT OFFICE.

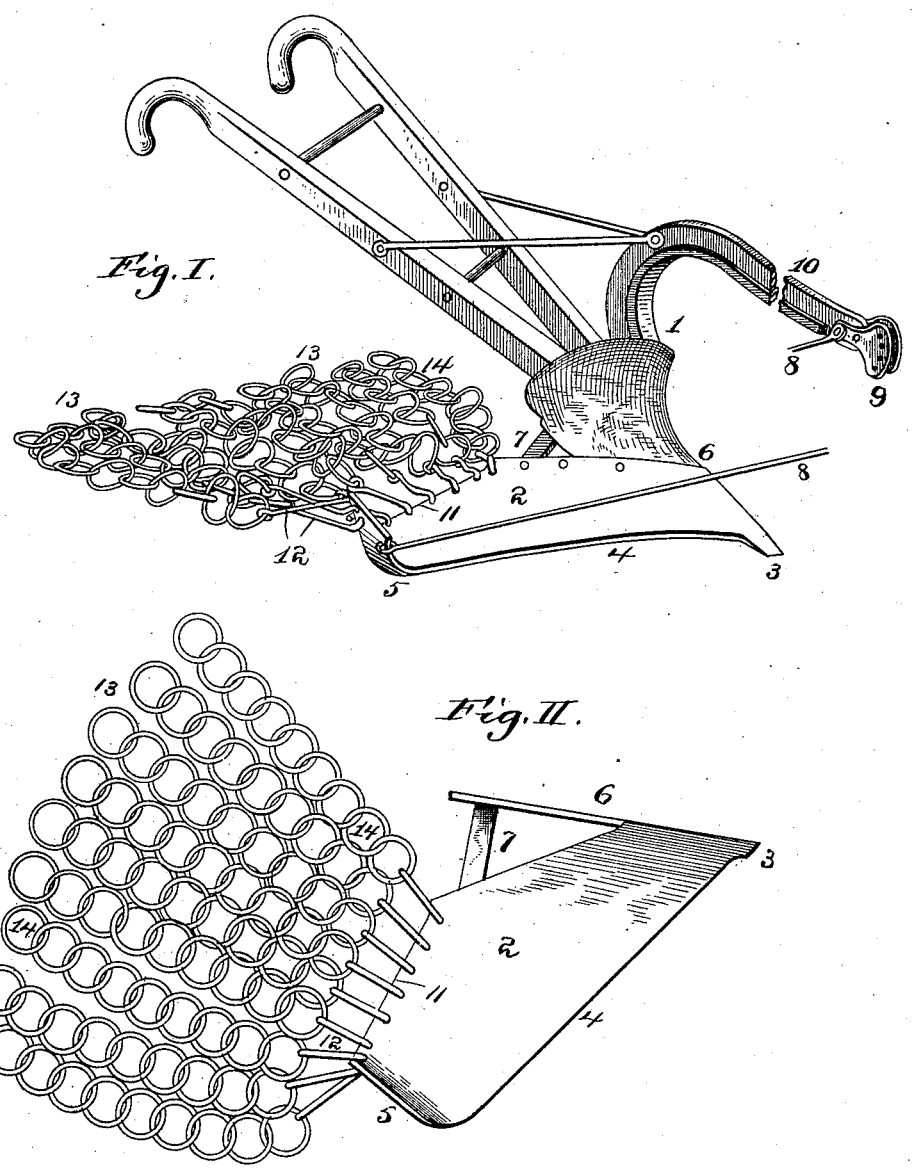

GEORGE M. MARSHALL, OF KILBOURN CITY, WISCONSIN.

POTATO-DIGGER.

SPECIFICATION forming part of Letters Patent No. 469,160, dated February 16, 1892.

Application filed December 26, 1890. Serial No. 375,827. (No model.)

*To all whom it may concern:*

Be it known that I, GEORGE M. MARSHALL, a citizen of the United States, residing at Kilbourn City, in the county of Columbia and State of Wisconsin, have invented certain new and useful Improvements in Potato-Diggers; and I do hereby declare the following to be a full, clear, and exact description of the invention, such as will enable others skilled in the art to which it appertains to make and use the same.

My invention relates to improvements in potato diggers, and has for its object to provide a simple device for digging potatoes and other vegetables and separating the vegetables from the earth which is turned up with them in the operation of digging.

With these ends in view my invention consists of the combination of a share and an agitating pliable mat or screen attached to the share. The share may be wider than the ordinary plowshare and it can be adjusted to any kind of plow in common use, said share having its outward extending end turned up to form a cutter which regulates the width of the furrow. Attached to the rear edge of the flat portion of the share and the upturned portion thereof, by means of suitable fastening devices, is a series of chains made of round links and placed as close together as possible to form the mat or screen hereinbefore mentioned for agitating and separating the potatoes and the earth turned up by the plow. This share is suitably braced by a rod connecting it with the plow-beam which serves to counteract the side draft or strain due to the pressure on the share.

To enable others to more readily understand my invention, I have illustrated the same in the accompanying drawings, in which—

Figure I is a view of my improved device attached to an ordinary plow, and Fig. II is a view of the share and separator disconnected from a plow.

Referring to the drawings, in which like numerals of reference denote corresponding parts in both figures, 1 designates the plow, which is of the ordinary kind used in turning the soil and is usually provided with a share and point for penetrating the ground; but the ordinary share is removed when it is desired to dig potatoes, &c., and my improved share 2 is attached in the usual manner, or by the screws or bolts 2'. This share 2 is constructed somewhat similar to the ordinary share; but it is made much broader and wider than is customary and lies substantially in a horizontal plane. The front projecting end is provided with a point 3, which assists the share in cutting through the ground, and also serves to guide and direct the progress of the plow. The cutting-edge 4 of the share is preferably sharpened and lies, substantially, at right angles to the length of the plow; but it is slightly curved. The outer extremity or edge 5 of the share is turned up in a vertical direction to form the guide for regulating the width of the furrow, and it will be readily seen that the share may thus be of any desired width; but it is preferably constructed of such size as to correspond with the size of the row of potatoes, in order to obviate liability of failure to turn up all of the potatoes in the row on which the plow operates.

The share 2 is firmly secured to the landside 6 at the point, and in the rear it is attached by means of the brace 7, in order to hold it firmly in position. In order to overcome the draft or strain on the plow-beam occasioned by the pressure on the share, I provide a rod or chain 8, which is secured to the upturned edge 5 of the share and is connected in any suitable manner to the clevis 9 or other convenient place on the plow-beam 10.

As hereinbefore stated, the share 2 lies substantially flat on the ground when in use, and the rear edge 11 thereof is constructed and arranged to lie at right angles to the landside 6, so that the potatoes and earth turned up by the share may be directed to pass squarely and evenly over the share in a direction parallel with the line of the cut in the ground.

Secured on the rear edge 11 of the share 2 by means of suitable hooks 12 or other fastening devices is a series of chains 13 13, composed of round rings or links 14, joined together in any suitable manner, but preferably connected one within the other. These chains are arranged as close together on the share as possible, and the links of each chain being thus very near to each other and in some cases overlapping each other the series of chains thus form a mat or screen over which the potatoes and the earth pass from the share 2 and by the agitation or movement of which the dirt, &c., are separated from the potatoes. These chains extend behind the share and drag along the ground, and, although at the front end where the chains are joined to the share they may overlap by reason of their proximity, still the rear part of the chains will be separated and spread over a larger surface of ground than the front part. This will prevent the potatoes and earth turned up by the share from slipping off of the side of the series of chains without passing back over them and off of the rear ends thereof, which passage over the chains, assisted by the agitation caused by the movement of the plow, causes the potatoes and earth to become separated and the earth sifts through the links of the chains, while the potatoes are carried back over the rear end of the chains and left exposed on the surface of the ground. To further prevent the potatoes and earth from passing over the side of the screen, the chains 13 are also provided on the rear edge of the upturned end 5 of the share, and these chains furnish a guide for the potatoes and earth as they leave the share. This mat or screen formed by the chains 13 13 serves to pulverize the earth, which sifts through it, and also levels the ground over which it passes, and thus the implement may be also used as a cultivator as well as for digging potatoes; but when the screen is used in this connection it is obvious that the broad wide share may be used or the screen may be connected to the ordinary share, as desired.

Although I have described my improved digger as applied to a plow for turning the sod and provided with a mold-board, I would have it understood that I do not confine myself to this particular form of plow, but reserve the right to use it in connection with any plow in common use by adapting and attaching the same to such a plow with such changes as fairly fall within the skill of a mechanic skilled in the art.

I am aware that changes in the form and proportion of parts and details of construction can be made without departing from the spirit or sacrificing the advantages of my invention, and I therefore reserve the right to make such changes as fall within the scope of my invention.

Having thus described my invention, what I claim as new, and desire to secure by Letters Patent, is—

In a potato-digger, the combination, with a sod-breaking plow, of a broad wide share having the curved front cutting-edge and the straight back edge, the chains extending rearwardly from the share and forming a pliable mat or screen, each chain comprising a series of circular rings interlocked at an angle to one another and partially overlapping the rings of adjacent chains, and the links secured to the front ring of each chain and provided with hooks to engage with holes or openings in the share, substantially as described.

In testimony whereof I affix my signature in presence of two witnesses.

GEORGE M. MARSHALL.

Witnesses:
F. H. MARSHALL,
WM. HOPKINSON.